United States Patent [19]
Lasky

[11] 3,812,429
[45] May 21, 1974

[54] METHOD OF COMPENSATING FOR UNKNOWN LENGTH OF TRANSMISSION LINE IN ELECTROMAGNETIC TACHOMETER

[75] Inventor: Ronald J. Lasky, Wheat Ridge, Colo.

[73] Assignee: Stock Equipment Company, Cleveland, Ohio

[22] Filed: Sept. 4, 1973

[21] Appl. No.: 394,154

Related U.S. Application Data
[62] Division of Ser. No. 220,091, Jan. 24, 1972.

[52] U.S. Cl. .................... 324/166, 331/74, 333/27, 333/28 R, 333/97 R
[51] Int. Cl. ........................ G01p 3/54, H03h 7/00
[58] Field of Search ............ 331/65, 74, 77; 333/24, 333/27, 28 R, 97 R

[56] References Cited
UNITED STATES PATENTS
3,233,193  2/1966  Cifelli ............................ 331/74 X

*Primary Examiner*—Paul L. Gensler
*Attorney, Agent, or Firm*—Bosworth, Sessions & McCoy

[57] ABSTRACT

A tachometer system in which a carrier signal is transmitted to a speed sensing and transmission-line-length compensating device. Bursts of the carrier signal are relayed by the device to a detector and comparator circuit where a signal is recovered indicating the rate at which objects pass the speed sensing device. A method of compensating for differences in transmission line length in different systems by tuning the speed sensing device to a resonant frequency greater than the frequency of the carrier signal. Increased transmission line length causes the resonant frequency of the line including the device to approach the frequency of the carrier signal and improve the gain of the transmission line.

3 Claims, 7 Drawing Figures

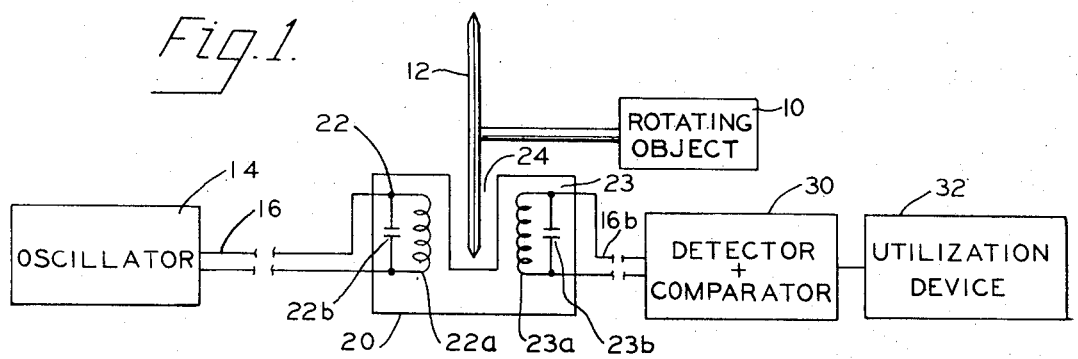
Fig. 1.
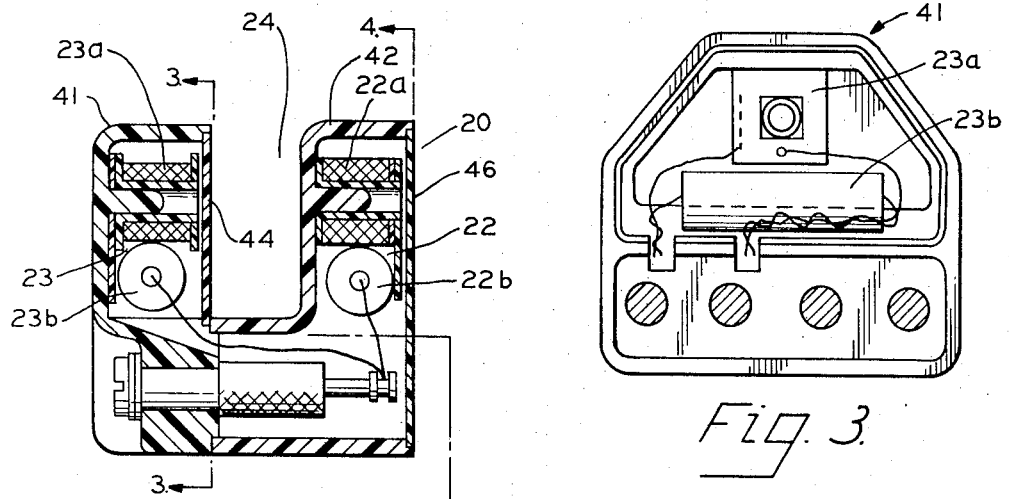
Fig. 2.
Fig. 3.
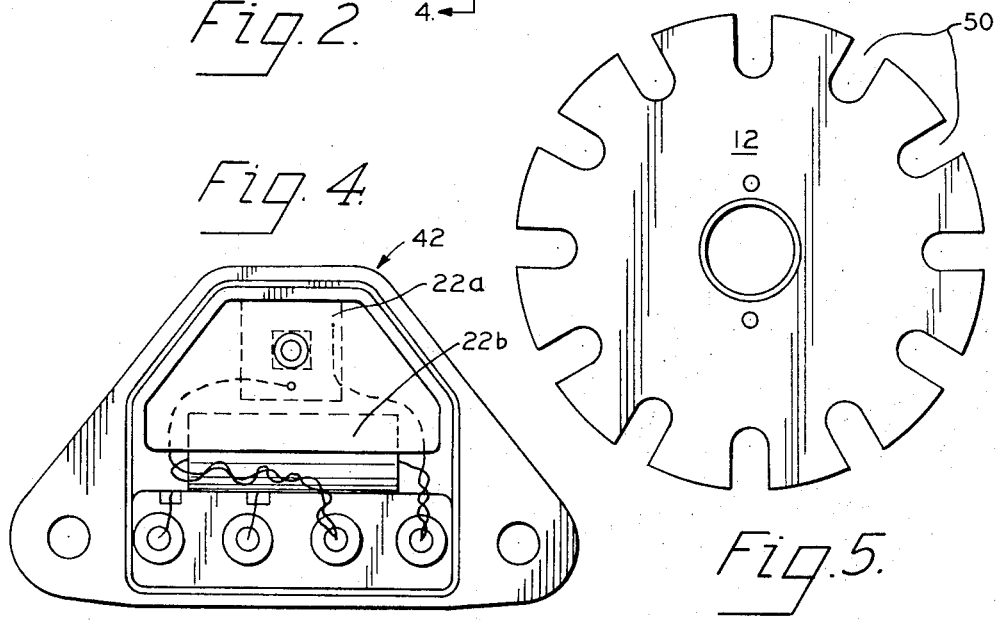
Fig. 4.
Fig. 5.

3,812,429

METHOD OF COMPENSATING FOR UNKNOWN LENGTH OF TRANSMISSION LINE IN ELECTROMAGNETIC TACHOMETER

This is a division, of application Ser. No. 220,091, filed Jan. 24, 1972.

BACKGROUND OF THE INVENTION

This invention relates generally to tachometer systems and devices for detecting the speed of a remote object and producing a signal indicative of such speed. More particularly, the invention relates to a tachometer system employing a carrier signal, to a tachometer device having particular advantage in such a system and to a method of compensating for the effect of different transmission line lengths on the carrier signal strength in such a system.

In many instances tachometer systems must be employed which are capable of detecting the rotational speed of a rotating object at a remote location and producing a signal for local use indicative of such rotational speed. Practical difficulties are encountered with such systems particularly with the speed sensing devices employed. Typical tachometer devices used in such systems are those which produce a magnetic field which is cut by the rotating object to produce a series of voltage pulses having a repetition rate proportional to the speed of the rotating object. A disadvantage with such devices is that the magnitude of the pulses produced is proportional to the speed of the rotating object so that it is difficult to detect low speeds of rotation. In addition, such devices require very precise positioning and adjustment with respect to the rotating object which cuts the magnetic field.

Another difficulty with tachometer systems of the type described above is the adjustment and calibration that must be performed to compensate for the different length of transmission lines in each particular system and similar variables between systems that operate in essentially an identical manner.

SUMMARY OF THE INVENTION

A general object of this invention is to provide a tachometer system that eliminates many of the disadvantages associated with prior systems.

Another object is the provision of such a system that will detect a stationary condition of a moving object.

Yet another object is the provision of a tachometer device for use in such a system which eliminates the need for precise positioning between it and a moving object having its speed sensed.

Another object of the invention is the provision in such a system of a tachometer device which can be located remote from other components of the system and in an environment hostile thereto.

Another object is to provide a tachometer device that transmits a carrier signal across an air gap and receives bursts thereof at a rate proportional to the speed of an object moving through the air gap and intermittently interrupting transmission of the carrier signal.

Still another object is the provision of a tachometer system for determining the rotational speed of a remote rotating object in which the components are interchangeable with corresponding components in like systems without the need for additional calibration due to different lengths of transmission line and different ranges of rotational speed of the rotating object.

Another object is the provision in such a tachometer system of a method for compensating for the effect of transmission line length on a signal strength.

In one aspect of the invention the effect of unknown transmission line lengths upon transmitted signal strength in a transmission system is compensated by providing a resonant circuit, selecting the resonant frequency of the resonant circuit such that the resonant frequency of a predetermined length of transmission line containing the resonant circuit is different from the frequency of the transmitted signal by an amount and in a direction such that a change in the length of transmission line causes the resonant frequency of the changed-length transmission line containing the resonant circuit to approach the frequency of the transmitted signal and thereby tend to compensate for adverse effects of the changed-length transmission line. The resonant circuit so selected is inserted in the transmission line of unknown length to establish the gain thereof at at least a known minimum.

Another aspect of the invention involves the provision for use in a tachometer system in which a carrier signal of known frequency is transmitted in bursts across an air gap at a rate proportional to the speed of objects passing through said air gap said carrier signal being conducted to and from said air gap by transmission lines of unknown length, of a speed sensing and transmission line length compensating device comprising transmitter circuit means and receiver circuit means separated by said air gap to permit magnetic coupling therebetween. Means are provided for supporting the circuit means so as to define the air gap which is dimensioned to permit the passage of the objects through the air gap. Coupling between the transmitter and receiver circuit means is alternately permitted and prevented at a rate proportional to the rate of passage of the objects. At least one of the transmitter and receiver circuit means is tuned to a resonant frequency higher than the frequency of the carrier signal.

BRIEF DESCRIPTION OF THE DRAWINGS

FIG. 1 is a block diagram of a system embodying the present invention.

FIG. 2 is a longitudinal sectional view of a tachometer device according to the present invention.

FIG. 3 is a view along the line 3—3 of FIG. 2.

FIG. 4 is a view along the line 4—4 of FIG. 2.

FIG. 5 is a side elevational view of a toothed disc rotatable in the air gap of the device shown in FIGS. 2 to 4.

DESCRIPTION OF THE PREFERRED EMBODIMENTS

Figure 6:
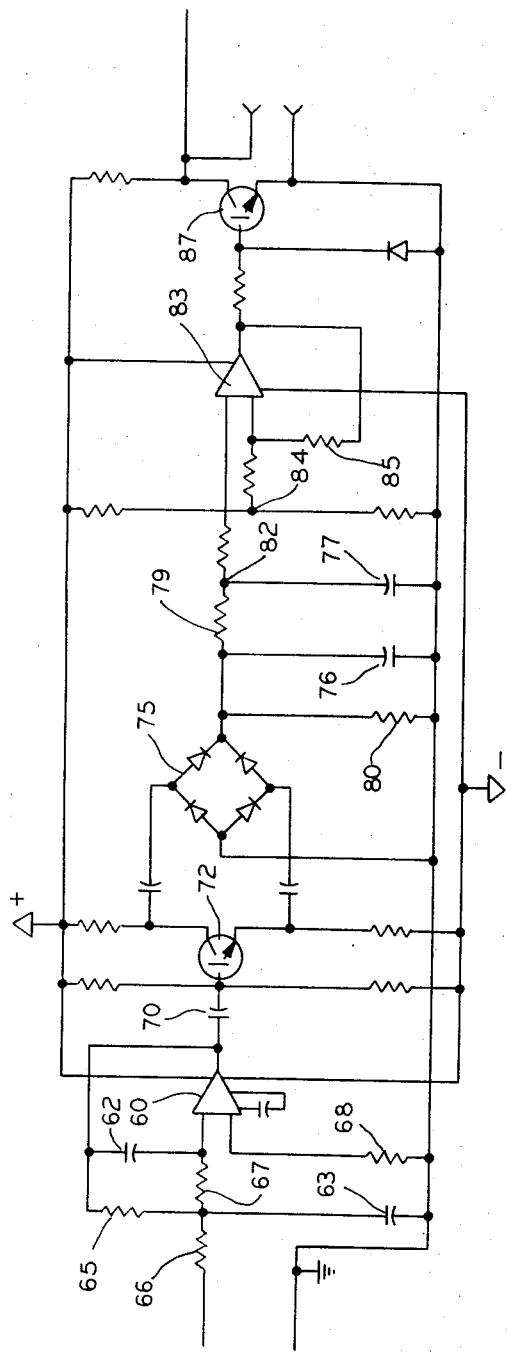
FIG. 6 is an electrical schematic diagram of the detector and comparator circuit shown in block form in FIG. 1.

The basic system shown in FIG. 1 is used to determine the rotational speed of a rotating object 10 and produce a signal representative of such speed which can then be employed for various control purposes. The rotating object 10 is suitably coupled to a disc 12 so that the disc rotates at a speed proportional to the speed of object 10. The disc 12 is notched at its outer periphery or otherwise provided with openings so that alternate teeth and notches pass a given point as the disc rotates. An oscillator 14 produces a carrier signal of known frequency which is transmitted via transmission line 16 to a tachometer device in the form of a transceiver 20.

Transceiver 20 is shown rather diagrammatically in FIG. 1 and includes a U-shaped housing having a transmitting circuit 22 in one leg and a receiving circuit 23 in the other leg with the legs separated by an air gap 24. The transmitting circuit 22 includes a coil 22a and a capacitor 22b having values so that the circuit 22 is tuned to a frequency somewhat higher than the carrier signal produced by oscillator 14 for reasons which will be discussed below. Receiver circuit 23 includes a coil 23a and, preferably, a capacitor 23b. If capacitor 23b is provided to tune the receiver circuit, the circuit 23 is tuned to a frequency in a range from a frequency close to that of oscillator 14 to the same frequency as transmitting circuit 22 as will be described more fully below. The housing of device 20 is made of nonmagnetic and electrically nonconductive material. In the absence of a tooth of disc 12 in air gap 24, the carrier signal from oscillator 14 is coupled across the air gap from transmitter circuit 22 to receiving circuit 23. When, however, air gap 24 is occupied by a tooth of disc 12 the coupling between circuits 22 and 23 is blocked and no carrier signal or a carrier signal of only very small amplitude is received by receiver circuit 23. To accomplish its shielding purpose disc 12 is made of aluminum or other material having good electromagnetic shielding properties.

As disc 12 rotates in air gap 24 the carrier signal from oscillator 14 is received by receiver circuit 23 in bursts at a rate proportional to the rotational speed of disc 12. The bursts of carrier signal are transmitted through transmission line 16b to a detector and comparator circuit 30 where the carrier frequency is eliminated and the signal is converted to a rectangular wave having a repetition rate proportional to the rotational speed of disc 12. This rectangular wave signal can then be transmitted to a utilization device 32 which represents any one of several devices which can employ the signal for control purposes.

A particular application for the system of FIG. 1 is in the control system for a coal feeder which regulates the amount of coal fed to a steam generator by which electric power is ultimately generated. In such a system the rotating object 10 might be a drive motor which determines the rate at which coal is fed to a burner and the utilization device 32 might be an error amplifier which compares the rate at which coal is actually fed to a desired rate in order to determine if a correction should be made. The system can also be used to detect zero speed of particular conveyor belt pulley for various control purposes.

Oscillator 14 in FIG. 1 may be any oscillator capable of producing a carrier signal of a desired frequency and of suitable amplitude. Oscillator 14 may be, for example, an oscillator available from the Stock Equipment Co. of Cleveland, Ohio as part No. 1-Z3644.

Transceiver 20 is illustrated in FIGS. 2 to 4 and includes a housing of glass filled polyester made in two pieces, the piece 41 shown in FIG. 3 containing the receiving circuit 23 and the piece 42 shown in FIG. 4 containing the transmitting circuit 22. The air gap between the circuits 22 and 23 is preferably about one-third inch wide and three-fourth inch deep. In assembly, the receiving coil 23a and receiving capacitor 23b are mounted in portion 41 and a cover 44 is installed over that portion. The two portions 41 and 42 are then snapped together to the position shown in FIG. 2 and the transmitting coil 22a and transmitting capacitor 22b are mounted in portion 42. The unit is then electrically tested to be certain that the transmitting and receiving circuits are electrically tuned to the desired frequencies. A cover 46 is then applied to the portion 42 and all the interior cavities of the device are filled with potting compound such as Emerson Cuming No. 2651 Compound. After the potting compound is cured the unit is again electrically energized and tested continuously for about 48 hours.

The pulse generating disc 12 is shown in FIG. 5. In the particular disc illustrated notches 50 are provided on the periphery spaced approximately 30° apart, each notch being about three-eighths inch wide and five-eighths inch deep. The disc itself has a diameter of 4 ½ inches and is formed of aluminum sheet one-eighth inches thick. Since the air gap 24 in transceiver 20 is about one-third inch wide and three-fourths inches deep the disc 12 can rotate therein and perform its function with substantial clearance and without the need for precise positioning of the disc within the gap.

The bursts of carrier signal received by receiver circuit 23 in FIG. 1 are supplied through transmission line 16b to detector and comparator 30 which is shown in detail in FIG. 6. The bursts of relatively high amplitude carrier signal represent the periods when a notch in disc 12 occupies the air gap 24 and permits coupling between transmitter circuit 22 and receiver circuit 23. The bursts of carrier signal are separated by periods of zero amplitude or relatively low amplitude carrier signal representing the periods when a tooth on the disc 12 prevents coupling between the transmitter and receiver circuits. These periods occur at rates proportional to the rotational speed of disc 12. In the detector and comparator 30 the high frequency carrier portion of the signal is eliminated and the resultant signal compared to a reference voltage to produce a rectangular wave output signal having a repetition rate proportional to the speed of rotation of disc 12.

Referring now to FIG. 6 the detector and comparator 30 includes an active filter comprising operational amplifier 60, capacitors 62 and 63 and resistors 65, 66, 67 and 68. The active filter serves to amplify the bursts of carrier signal and to alternate frequencies greater than that of the carrier signal and thereby eliminate harmonies of the carrier signal frequency. The amplified signal is then passed through a coupling capacitor 70 to a phase splitting transistor 72 and from there to a detector circuit including bridge circuit 75, capacitors 76 and 77 and resistors 79 and 80. Capacitor 70 serves to remove the D.C. level of the amplified signal while transistor 72 in its associated circuit provides a new D.C. level so that the full amplitude of the amplified signal can be recovered by the detector circuit. The detector circuit filters out the high frequency carrier signal to recover the lower frequency signal having a repetition rate proportional to the rotational speed of disc 12.

The recovered signal is then supplied to one input 82 of a comparator amplifier 83 having its other input connected to a reference voltage at point 84. The reference voltage is a D.C. voltage chosen as a discriminating level such that if the recovered signal exceeds the reference voltage it is considered to represent a period when the transmitting circuit 22 and the receiving circuit 23 of FIG. 1 were coupled. Similarly, if the recovered signal is less than the reference voltage it is considered to represent a period when coupling between the transmitting and receiving circuits was blocked by a tooth on the disc 12. Resistor 85 provides regenerative feedback which eliminates spurious pullation of comparator amplifier 83.

Comparator 83 is essentially an open loop differential amplifier and assumes a first stable output state when the recovered signal is greater than the reference voltage and assumes a second stable state when the recovered signal is less than the reference voltage. The output of comparator 83 is thus a rectangular wave having a repetition rate proportional to the speed of rotation of disc 12 which in turn is proportional to the rate of rotation of rotating object 10. This rectangular wave signal is supplied to transistor 87 which serves as a buffer amplifier. The output signal from transistor 87 is thus also a rectangular wave signal having a repetition rate proportional to the rotational speed of disc 12. This signal may be transmitted to one or more of a number of other circuits and devices represented by utilication device 32 in FIG. 1 for various control purposes.

Systems such as shown in FIG. 1 may be supplied as part of or in conjunction with larger systems and machinery such as the automatic coal feeder mentioned above. The system of FIG. 1 naturally requires some set-up for each particular installation but it is desirable to keep the required set-up time for each installation to a minimum. Also, in case a component malfunctions or becomes defective in operation it is highly desirable to be able to replace the component with a like component without the necessity of specific calibration and repeated set-up procedures. Some of the need for calibration and set-up can be eliminated by careful standardization of components and elimination of other variables. One variable that remains, however, between systems is the length of transmission line 16, 16b. Normally, the transceiver 20 and associated equipment wil be located closely adjacent the object having its speed measured while oscillator 14, detector and comparator 30 and similar equipment may be located in a remote control area. Whereas the transceiver 20 may be required by the application to be located in an environment where it is subject to extreme temperatures, temperature variations, and similar hostile conditions, it is desirable to locate the electronic portions of the system in a more favorable environment and in a single, central control area. The distance from transceiver site to control area may vary greatly from installation to installation within the same plant or in different plants.

Transmission lines considerably affect high frequency signals such as those provided by oscillator 14 because of their series impedance effects and because of distributed capacitance. Since the length of transmission line varies from system to system, each system must normally be calibrated and set-up to accommodate the length of its particular transmission line so that signal strength etc., will be adequate at all locations. A particular aspect of the present invention is the provision of a method of compensating for the effects of different lengths of transmission line on signal strength so that the components of the system of FIG. 1 can be standardized and interchangeable in any system without the necessity for extensive recalibration.

This method relies upon introducing a resonant condition into the transmission system between the oscillator 14 and detector and comparator 30 and deliberately selecting the center resonant frequency to be different than the frequency of oscillator 14. The resonant condition is selected so that a change in length of transmission line 16, 16b will cause the center resonant frequency to approach the oscillator frequency, which will improve the gain of the transmission system to compensate for the adverse effects of the changed length on signal strength.

Preferably, the resonant condition is selected so that the "gain" of the transmission system is relatively low for a minimum length, for example, zero length, of transmission line and so that an increase in the length of transmission line will improve the gain of the transmission system to compensate for the adverse effects of the increased length on signal strength. To accomplish this, either transmitter circuit 22 or receiver circuit 23 is tuned to frequency that is higher than the frequency of the carrier signal from oscillator 14. The other one of circuits 22 and 23 may be tuned to the same frequency as the first circuit for a relatively narrow peaked resonant condition or to a lower frequency for a broader, less peaked resonant condition. The second circuit may also be left untuned.

Figure 7:
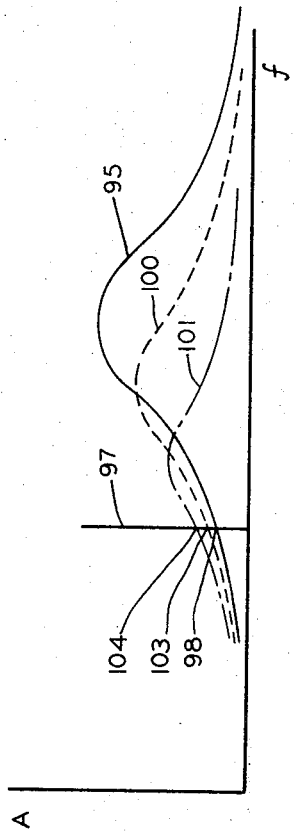
FIG. 7 shows three frequency response curves for transmission lines of different lengths which illustrate the method of the present invention for compensating for different lengths of transmission line.

This is illustrated in FIG. 7 where the curve 95 represents the frequency response of transmitter circuit 22 and receiver circuit 23, and, therefore, also of the transmission circuit between oscillator 14 and detector and comparator 30 for a zero length of transmission line 16, 16b. Curve 95 represents this frequency response in the case where transmitter circuit 22 and receiver circuit 23 are tuned to slightly different frequencies. These circuits could be tuned to the same frequency in which case curve 95 would be more peaked at the common resonant frequency of the circuits. The vertical line 97 in FIG. 7 represents the frequency of the carrier signal from oscillator 14. Thus, the "gain" of the transmission system is relatively low as represented by the point 98 in FIg. 7 and the amplitude of the signal received by detector and comparator 30 is relatively small. This minimum amplitude signal is more than adequate, however, to allow detector and comparator 30 to distinguish between it and the much smaller amplitude signal transmitted when air gap 24 is blocked by disc 12.

The curves 100 and 101 represent the frequency response characteristics for transmission lines, including transceiver 20, of intermediate length and of maximum length, respectively. As the length of transmission line increases the disturbed capacitance increases and shifts the frequency response curve of the transmission system to the left in FIG. 7 toward the line 97 representing the frquency of the carrier signal from oscillator 14. It can be seen from FIG. 7 that this will improve the gain of the system and increase the amplitude of the signal received by detector and comparator 30 as indicated by the points 103 and 104. For a known and specified transmission line having particular characteristics the advantage shown in FIG. 7 can be obtained. Even though the peaks of the frequency response curves 100 and 101 are lower due to the increased length of transmission line this is more than compensated by the shift of the curves toward the frequency of the carrier signal represented by vertical line 97.

As the length of transmission line increases the amplitude of the signal at the input of detector and comparator 30 also increases. This has no adverse effect on the output signal, however, since it is the repetition rate of the signal that indicates the rate of rotation of disc 12. The only requirement for the amplitude of the signal at the input of detector and comparator circuit 30 is that it be capable of producing a signal at the input 82 of comparator 83 that is less then the reference voltage at point 84 when air gap 24 is blocked and is greater than the reference voltage when air gap 24 is not blocked.

A preferable frequency range for the carrier signal from oscillator 14 is from about 20 KHz to about 100 KHz and for resonant frequency of the composite circuit including transmitter circuit 22 and receiver circuit 23 is from about 2 percent to 10 percent higher.

In a particular example of the method described above, oscillator 14 was adjusted to produce a carrier signal of 22 volts, peak to peak, at 34 KHz. Transmitter circuit 22 and receiver circuit 23 were tuned to resonant frequencies of 39 KHz and 33 KHz, respectively, with zero length of transmission line. Transmission lines 16, 16*b* were specified as Stock Equipment Company cable, part No. FE 2890, having a capacitance per foot of 40 picofarads. With these values the system of FIG. 1 can be used with transmission lines from 0 to 1,000 feet in length without the need for calibration.

While a preferred form of this invention has been specifically illustrated and described herein it will be apparent to those skilled in the art that modifications and improvements may be made to the form herein specifically disclosed. In particular it will be appreciated that the objects passing through air gap 24 are not confined to being teeth on a rotating disc but may also be, for example, individual objects or parts on an object moving linearly, through the gap. Accordingly, the present invention is not to be limited to the form herein specifically disclosed nor in any other way inconsistent with the progress in the art promoted by this invention.

What is claimed is:

1. In a system in which a signal of known frequency and amplitude is transmitted over a transmission line of unknown length, a method of compensating for the effect of the unknown length of transmission line upon signal strength comprising the steps of providing a resonant circuit, selecting the resonant frequencey of the resonsant circuit such that the resonant frequency of a predetermined length of transmission line containing the resonant circuit is different from the frequency of the transmitted signal by an amount and in a direction such that a change in length of transmission line causes the resonant frequency of the changed-length transmission line containing the resonant circuit to approach the frequency of the transmitted signal and thereby tend to compensate for adverse effects of the changed-length transmission line, and inserting the resonant circuit into the transmission line of unknown length to establish the gain thereof at at least a known minimum.

2. A method as claimed in claim 1 wherein the resonant frequency of the resonant circuit is selected so that the resonant frequency of a predetermined minimum length of transmission line containing the resonant circuit is greater by a predetermined amount than the frequency of the transmitted signal, whereby adverse effects of an increase in length of transmission line upon signal strength tend to be compensated in response to said increase in the length of transmission line.

3. A method according to claim 2 in a tachometer system in which said signal is a carrier signal transmitted in periodic bursts across an air gap from a transmitter circuit to a receiver circuit at a repetition rate proportional to the speed of objects passing through said air gap, one of said transmitter and receiver circuits constituting said resonant circuit, said resonant circuit being tuned to a resonant frequency such that the resonant frequency of a transmission line of minimum length including said transmitter and receiver circuits is greater than the frequency of said carrier signal so that an increase in length of transmissioon line causes the resonant frequency of the transmission line including transmitter and receiver circuits to approach the frequency of said carrier signal, whereby the tuning of said resonant circuit substantially compensates for the adverse effects on signal strength of the unknown length of transmission line.

* * * * *